(12) United States Patent
Kurano et al.

(10) Patent No.: US 8,304,119 B2
(45) Date of Patent: Nov. 6, 2012

(54) GASKET

(75) Inventors: Yoshihiro Kurano, Fujisawa (JP); Takashi Mashimo, Fujisawa (JP)

(73) Assignee: Nok Corporation, Tokyo (JP)

( * ) Notice: Subject to any disclaimer, the term of this patent is extended or adjusted under 35 U.S.C. 154(b) by 1168 days.

(21) Appl. No.: 12/213,922

(22) Filed: Jun. 26, 2008

(65) Prior Publication Data

US 2009/0075143 A1 Mar. 19, 2009

Related U.S. Application Data

(62) Division of application No. 10/545,228, filed as application No. PCT/JP2004/012511 on Aug. 31, 2004, now abandoned.

(30) Foreign Application Priority Data

Sep. 2, 2003 (JP) ................................. 2003-309834
Nov. 5, 2003 (JP) ................................. 2003-375132

(51) Int. Cl.
*H01M 8/00* (2006.01)

(52) U.S. Cl. ........ 429/400; 429/463; 429/483; 429/507; 277/317; 422/500

(58) Field of Classification Search .................. 429/400, 429/483, 507; 277/317; 422/500
See application file for complete search history.

(56) References Cited

U.S. PATENT DOCUMENTS

| 4,621,469 | A | 11/1986 | Kruschwitz ..................... 52/208 |
| 6,202,983 | B1 | 3/2001 | Hartman et al. ............... 251/306 |
| 6,287,402 | B2 | 9/2001 | Soldner ............................ 156/71 |
| 6,796,699 | B2 | 9/2004 | Birk et al. ..................... 362/556 |
| 7,001,686 | B2 | 2/2006 | Wells et al. ..................... 429/36 |

FOREIGN PATENT DOCUMENTS

| JP | 2001185174 A | 7/2001 |
| WO | WO 02/073072 A1 | 9/2002 |

*Primary Examiner* — Jyoti Nagpaul
(74) *Attorney, Agent, or Firm* — Jacobson Holman PLLC

(57) ABSTRACT

In order to inhibit a gasket (1) adhered to a plate body such as a separator (3) of a fuel battery or the like from being adversely affected by an elution component from an adhesion means, the gasket has a main lip (11), a back surface seal portion (12) formed in a back surface of the main lip and closely contacted with a separator (a plate body to be adhered) (3), an adhesion portion (14) arranged in a position in an opposite side to a space (S) to be sealed with respect to the back surface seal portion (12) and adhered to a bottom portion (31*a*) of a gasket installation groove (31) of the separator (3) via an adhesive agent (2), and an adhesive agent sump (15) formed between the back surface seal portion (12) and the adhesion portion (14) and holding an excess adhesive agent (2*a*).

2 Claims, 8 Drawing Sheets

GASKET

This application is a Divisional of application Ser. No. 10/545,228 filed Aug. 12, 2005, now abandoned which is a nationalization of PCT/JP2004/012511 filed 31 Aug. 2004 and published in Japan.

TECHNICAL FIELD

The present invention relates to a gasket sealing between fixed members, and more particularly to a gasket which can be applied as a sealing means for a separator of a fuel battery and a top cover of a hard disc drive (HDD).

BACKGROUND ART

The fuel battery employs a stack structure obtained by laminating a lot of fuel battery cells each constituted by a membrane electrode assembly (MEA) in which a high polymer electrolyte membrane is inserted between a pair of catalyst electrode layers, and a carbon separator. In the case that they are many, the number of the fuel battery cells is some hundreds. An oxidizing gas (an oxygen) is supplied to one catalyst electrode layer from an oxidizing gas flow path formed in one surface of each of the separators, a hydrogen is supplied to the other catalyst electrode layer from a fuel gas flow path formed in the other surface of each of the separators, and an electric power is generated on the basis of an electrochemical reaction corresponding to a reverse reaction of an electrolytic process of the water, that is, a reaction of generating the water from the hydrogen and the oxygen.

FIG. 14 is a cross sectional view showing a part of the fuel battery. Reference numeral 101 denotes a high polymer electrolyte membrane, reference symbols 102A and 102K denote catalyst electrode layers in both sides thereof, and reference numeral 103 denotes a separator. The separator 103 is provided with a gasket 104 made of a rubber-like elastic material, and a seal projection 104a is close contacted with the high polymer electrolyte membrane 101, thereby preventing the hydrogen gas and the oxygen gas supplied to the catalyst electrode layers 102A and 102K from leaking to the external. It has been conventionally known that this kind of gasket 104 is adhered to the separator 103 via an adhesive agent 105 after being formed.

In this case, since the separator 103 has an operation as a collecting plate from the catalyst electrode layers 102A and 102K in addition to an operation of sealing the gas supplied to the catalyst electrode layers 102A and 102K, and the separators 103 in both sides of the high polymer electrolyte membrane 101 or the like respectively form a negative electrode and a positive electrode, it is necessary to insulate them. Accordingly, in conventional, for example, as described in Japanese Unexamined Patent Publication No. 2003-197249, Japanese Unexamined Patent Publication No. 2001-283893 and Japanese Unexamined Patent Publication No. 2002-158018, an insulating means is provided between the separators in the periphery of a power generating portion by the MEA. In other words, in the insulating means described in the Japanese Unexamined Patent Publication No. 2003-197249, the insulation between the separators is achieved by the high polymer electrolyte membrane by making an outer peripheral edge of the high polymer electrolyte membrane into the same shape and the same size as an outer peripheral edge of the separator. Further, in the case that the size of the high polymer electrolyte membrane is limited to a peripheral edge portion of a power generating region as in the structure described in the Japanese Unexamined Patent Publication No. 2001-283893 or No. 2002-158018, a sheet-like insulating layer is interposed between the separators, in an outer peripheral side of the high polymer electrolyte membrane.

However, in accordance with the structure as shown in FIG. 14, if there is a portion where the layer of the adhesive agent 105 adhering the separator 103 (or the high polymer electrolyte membrane 101) and the gasket 104 is not applied, the leakage is generated there. Accordingly, the adhesive agent 105 is applied all around the periphery. However, if a part of the adhesive agent 105 runs over from the adhesion surface of the gasket 104 as shown by reference symbol 105a and is exposed to the gas flow path in large quantities, there is a case that a battery performance is adversely affected by an elution component from the adhesive agent 105.

Further, in accordance with the structure as described in the Japanese Unexamined Patent Publication No. 2003-197249, since an area of the expensive high polymer electrolyte membrane is expanded to a portion which is not used for power generation, there is a problem that a cost is increased. In this connection, the structure described in the Japanese Unexamined Patent Publication No. 2001-283893 or No. 2002-158018 does not have the problem mentioned above, however, an independent gasket lip (a linear projection) is provided in the sheet-like insulating layer. In this case, the gasket lip is adhered to the sheet-like insulating layer by using the adhesive agent in the light of a displacement prevention and a sealing performance. Accordingly, similarly to that shown in FIG. 14, there is a risk that a part of the adhesive agent is exposed to the gas flow path or the like and a battery performance is adversely affected by the elution component from the adhesive agent. Further, there is a risk that an adhesion peeling between the insulating layer and the gasket lip is generated in use for a long period and a sealing performance is deteriorated.

DISCLOSURE OF THE INVENTION

Problem to be Solved by the Invention

The present invention is made by taking the problem mentioned above into consideration, and a technical problem of the present invention is to inhibit a gasket adhered to a plate body such as a separator of a fuel battery or the like from being adversely affected by an elution component from an adhesion means.

Means for Solving the Problem

As a means for effectively solving the technical problem mentioned above, in accordance with a first aspect of the present invention, there is provided a gasket adhered to a plate body, comprising:

a back surface seal portion which is closely contacted with the plate body to be adhered; and an adhesion portion adhered to the plate body to be adhered via an adhesion means at a position in an opposite side to a space to be sealed with respect to the back surface seal portion.

In accordance with a second aspect of the present invention, there is provided a gasket as recited in the first aspect, wherein the back surface seal portion is formed in a back surface of a main lip.

In accordance with a third aspect of the present invention, there is provided a gasket as recited in the first or second aspect, wherein the adhesion means is constituted by an adhesive agent, and an adhesive agent sump holding an excess adhesive agent is provided between the back surface seal portion and the adhesion portion.

In accordance with a fourth aspect of the present invention, there is provided a gasket as recited in any one of the first to third aspects, wherein the back surface seal portion is closely contacted with a bottom portion of a gasket installation groove formed in the plate body to be adhered.

In accordance with a fifth aspect of the present invention, there is provided a gasket, wherein a gasket lip is integrally provided in an insulation layer interposed between separators of a fuel battery, and the insulation layer is adhered to a separator via an adhesion means in a region in an opposite side to a space to be sealed with respect to the gasket lip.

In accordance with a sixth aspect of the present invention, there is provided a gasket as recited in the fifth aspect, wherein a gasket lip made of the same material as the insulation layer is integrally formed in the insulation layer.

Effect of the Invention

In accordance with the gasket on the basis of the invention described in the first aspect, since the portion between the adhesion portion (the adhesion means) and the space to be sealed is sealed by the back surface seal portion, it is possible to effectively prevent the component included in the adhesion means from being eluted to the space to be sealed, so that in the case that the gasket is applied to the gasket of the fuel battery separator, it is possible to effectively prevent the adverse effect caused by the component elution into the oxidizing gas flow path or the fuel gas flow path corresponding to the space to be sealed. Further, since sealing in the fixed side to the plate body to be adhered is made by the back surface seal portion, and does not depend upon the sealing performance by the adhesion means, it is possible to reduce a use amount of the adhesion means such as the adhesive agent or the like, and it is possible to restrict an amount of the elution component.

In accordance with the gasket on the basis of the second aspect of the present invention, since the back surface seal portion is exposed to the reaction force on the basis of a collapsing margin of the main lip, a close contact force with respect to the plate body to be adhered is increased, and it is possible to further improve the sealing performance between the adhesion portion (the adhesion means) and the space to be sealed.

In accordance with the gasket on the basis of the third aspect of the present invention, since the excess adhesive agent going to run over to the back surface seal portion side from the portion between the adhesion portion and the plate body to be adhered is held in the adhesive agent sump in the case that the adhesive agent is employed as the adhesion means, it is possible to further securely prevent the excess adhesive agent from running over to the space to be sealed side.

In accordance with the gasket on the basis of the fourth aspect of the present invention, since the back surface seal portion of the gasket is positioned by the gasket installation groove formed in the plate body to be adhered, it is possible to stably fix the gasket.

In accordance with the gasket on the basis of the fifth aspect of the present invention, since the adhesion region between the insulation layer integrally having the gasket lip, and the separator exists in the opposite side to the space to be sealed with respect to the gasket lip, the portion between the adhesion region and the space to be sealed is sealed by the reaction force against the collapse of the gasket lip, it is possible to effectively prevent the component included in the adhesion means from being eluted to the space to be sealed, and it is possible to effectively prevent the adverse effect caused by the component elution of the adhesion means to the space to be sealed.

In accordance with the gasket on the basis of the sixth aspect of the present invention, since no joint portion exists between the gasket lip and the insulation layer, the sealing performance is further improved, the adhesion means between the gasket lip and the insulation layer is not necessary, and the gasket can be provided at a low cost.

Figure 1:
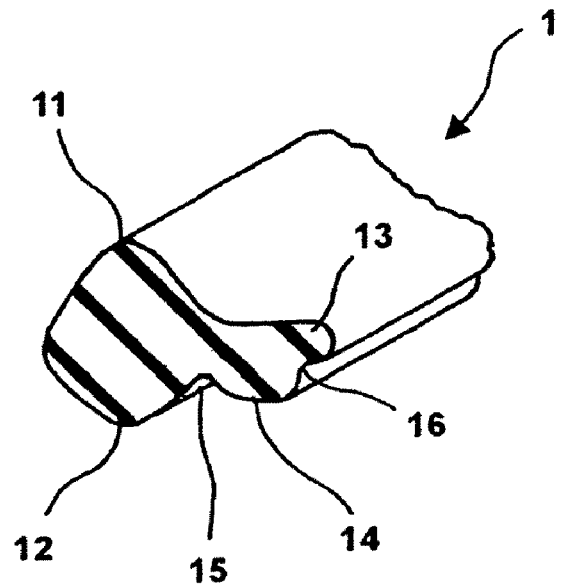
FIG. 1 is a partly cross sectional perspective view showing a single body of a first embodiment in which a gasket in accordance with the present invention is applied as a gasket for a fuel battery.

DESCRIPTION OF REFERENCE NUMERALS 1, 1A, 1B GASKET
11, 11A, 11B, 52A, 53A MAIN LIP 12, 12A, 12B BACK SURFACE SEAL PORTION
13, 13A, 13B EXTENSION PORTION
13a FITTING GROOVE
14, 14A, 14B ADHESION PORTION
15 ADHESIVE AGENT SUMP
16 STEP PORTION
17 MEMBRANE PORTION
2 ADHESIVE AGENT (ADHESION MEANS)
2a EXCESS ADHESIVE AGENT
21 SHEET-LIKE ADHESION MEMBER (ADHESION MEANS)
3 SEPARATOR
3a FLAT SURFACE
31, 31A-31D GASKET INSTALLATION GROOVE
31a BOTTOM PORTION
32, 37, 38 GROOVE SHOULDER
33 FLOW PATH GROOVE (SPACE TO BE SEALED)
34-36, 51b-51d MANIFOLD (SPACE TO BE SEALED)
4 HIGH POLYMER ELECTROLYTE MEMBRANE
40 MEA
41, 42 CATALYST ELECTRODE LAYER
5 GASKET
51 INSULATION LAYER
51a WINDOW PORTION
52, 53 GASKET LIP
52B, 53B BACK SURFACE LIP
P ADHESIVE AGENT APPLICATION REGION
S, S1, S2 SPACE TO BE SEALED

BEST MODE FOR CARRYING OUT THE INVENTION

Figure 2:
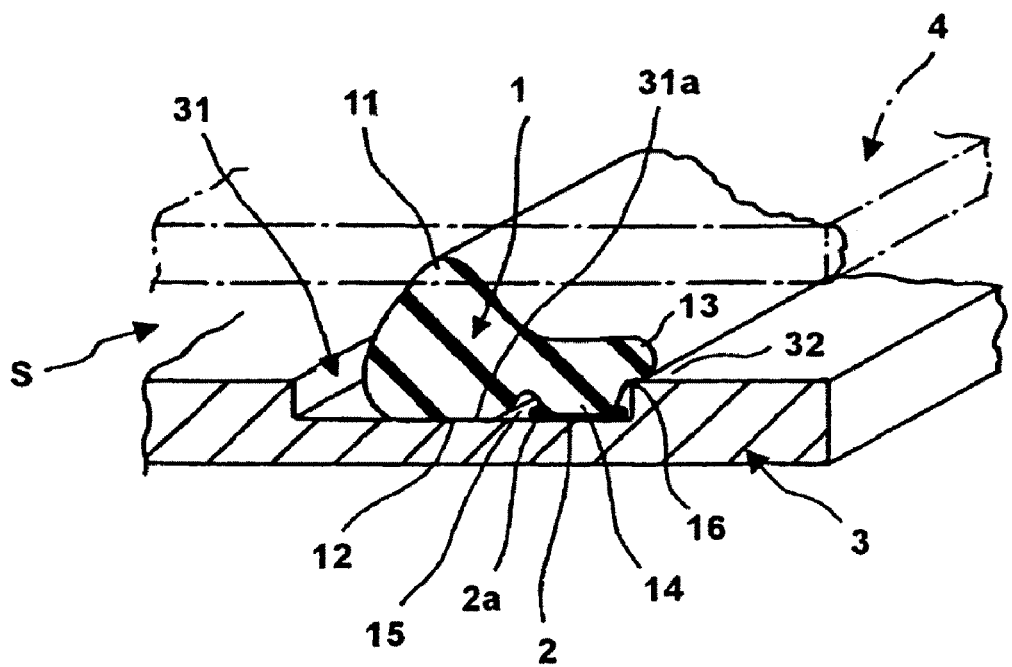
FIG. 2 is a partly cross sectional perspective view showing an installation state of the first embodiment in which the gasket in accordance with the present invention is applied as the gasket for the fuel battery.

A description will be given below of a preferable embodiment of a gasket in accordance with the present invention with reference to the accompanying drawings. First, FIG. 1 is a partly cross sectional perspective view showing a single body of a first embodiment in which a gasket in accordance with the present invention is applied as a gasket for a fuel battery, and FIG. 2 is a partly cross sectional perspective view showing an installation state of the same. In this case, in the following description, a term "back surface" means a surface directed to an opposite side to a main lip 11 in a gasket 1, that is, a surface directed to a separator 3 side.

The gasket in accordance with this embodiment is provided with a structure corresponding to the first to fourth aspects, is adhered to the separator 3 of a fuel battery via an adhesive agent 2 as shown in FIG. 2, is interposed between the separator 3 and a high polymer electrolyte membrane 4 so as to prevent a hydrogen gas or an oxidizing gas from leaking out from a space S to be sealed such as a fuel gas flow path, an oxidizing gas flow path or the like for supplying a hydrogen gas or an oxidizing gas (an oxygen) to a catalyst electrode layer (not shown), and is formed by a rubber-like elastic material, preferably a rubber-like elastic material selected from a silicone rubber (VMQ), a fluorine-contained rubber (FKM), an ethylene propylene rubber EPDM) or the like. In this case, the separator 3 corresponds to the plate body to be adhered described in the first aspect, is formed by a carbon and has a conductivity.

As shown in FIG. 1, the gasket 1 has the main lip 11 protruding in a chevron shape, a back surface seal portion 12 protruding to a back surface side, an extension portion 13 protruding to an opposite side to the space S to be sealed from a portion between the main lip 11 and the back surface seal portion 12, and an adhesion portion 14 formed so as to protrude to a back surface side of the extension portion 13.

Further, a groove-like adhesive agent sump 15 is provided in a concave shape between the back surface seal portion 12 and the adhesion portion 14.

On the other hand, as shown in FIG. 2, a gasket installation groove 31 extending in correspondence to an installation position of the gasket 1 and having a rectangular cross section is formed in the separator 3. The gasket installation groove 31 is formed at a width which can receive the back surface seal portion 12 and the adhesion portion 14 in the gasket 1. In other words, the gasket 1 is structured such that, in the state of a step portion 16 between an end portion of the extension portion 13 and the adhesion portion 14 being positioned at a groove shoulder 32 in an opposite side to the space S to be sealed in the gasket installation groove 31, the back surface seal portion 12 is closely contacted with a position close to the space S to be sealed in a bottom portion 31a of the gasket installation groove 31, and the adhesion portion 14 is adhered to a position close to the opposite side to the space S to be sealed in the bottom portion 31a of the gasket installation groove 31 via the adhesive agent 2.

In the structure mentioned above, when adhering the gasket 1 to the separator 3, the gasket 1 is adhered to the separator 3 by first applying the adhesive agent 2 to a position close to the opposite side to the space S to be sealed in the bottom portion 31a of the gasket installation groove 31 in the separator 3, and pressing the adhesion portion 14 of the gasket 1 to an application surface of the adhesive agent 2 in the state of positioning the step portion 16 at the groove shoulder 32 in the opposite side to the space S to be sealed of the gasket installation groove 31. At this time, an excess adhesive agent 2a runs over to both sides of the adhesion portion 14, however, since the adhesive agent sump 15 is provided between the adhesion portion 14 and the back surface seal portion 12, the excess adhesive agent 2a running over toward the back surface seal portion 12 side from the adhesion portion 14 is held within the adhesive agent sump 15, whereby it is possible to effectively prevent the excess adhesive agent 2a from interposing to the back surface seal portion 12 side.

Further, since the gasket 1 is structured such that the main lip 11 is closely contacted with the high polymer electrolyte membrane 4 shown by a single dot chain line in FIG. 2 with a desired collapse margin, the back surface seal portion 12 formed in the back surface side of the main lip 11 is closely contacted with the bottom portion 31a of the gasket installation groove 31 by a suitable surface pressure. Accordingly, it is possible to effectively prevent an eluted component from the excess adhesive agent 2a within the adhesive agent sump 15 from being discharged to the space S to be sealed. In this case, the high polymer electrolyte membrane 4 is provided with catalyst electrode layers (a fuel electrode and an air electrode) (not shown) in both sides in a thickness direction thereof so as to structure the MEA.

Further, the sealing with the separator 3 corresponding to the plate body to be adhered in the fixed side is executed by the back surface seal portion 12, and does not depend on the adhesive agent 2 interposed between the bottom portion 31a and the adhesion portion 14. Accordingly, the adhesive agent 2 is not necessarily applied to an entire periphery of the bottom portion 31a as far as a necessary amount for fixing the gasket 1 is provided. Therefore, it is possible to reduce a use amount of the adhesive agent 2, and it is possible to inhibit an amount of the eluted component from the adhesive agent 2. Further, in the case that the adhesive agent 2 is applied to the entire periphery of the bottom portion 31a, the sealing is executed by both of the back surface seal portion 12 and the adhesion portion 14. Accordingly, it is possible to make a sealing performance with respect to the space S to be sealed on the basis of a double seal operation.

Figure 3:
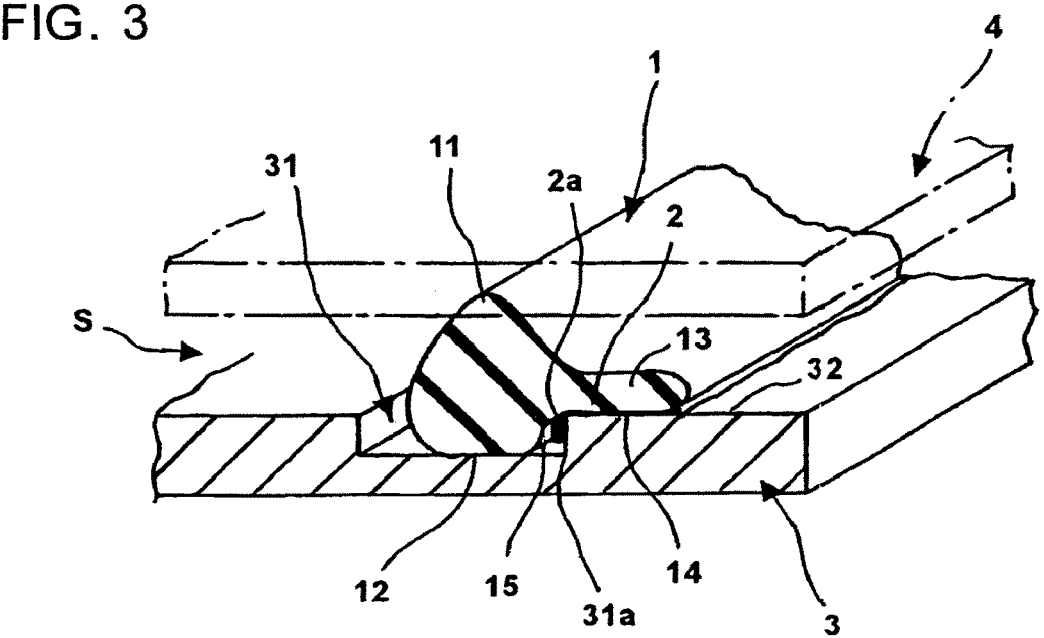
FIG. 3 is a partly cross sectional perspective view showing an installation state of a second embodiment in which the gasket in accordance with the present invention is applied as the gasket for the fuel battery.

Next, FIG. 3 is a partly cross sectional perspective view showing an installation state of a second embodiment in which the gasket in accordance with the present invention is applied as the gasket for the fuel battery. This embodiment is also basically provided with the structure corresponding to the first to fourth aspects, and is structured such that a flat back surface of the extension portion 13 protruding to the opposite side to the space S to be sealed from a portion between the main lip 11 and the back surface seal portion 12 forms the adhesion portion 14, and the gasket installation groove 31 of the separator 3 is formed at a width which can receive the back surface seal portion 12 of the gasket 1.

In other words, the adhesion portion 14 of the gasket 1 is adhered to the groove shoulder 32 in the opposite side to the space S to be sealed of the gasket installation groove 31 via the adhesive agent 2. The adhesive agent sump 15 is formed in a step groove shape between the back surface seal portion 12 and the adhesion portion 14, the excess adhesive agent 2a running over to the back surface seal portion 12 side from the portion between the groove shoulder 32 and the adhesion portion 14 at a time of applying the adhesive agent 2 to the groove shoulder 32 so as to adhere the adhesion portion 14 is held between the end portion 31a in the opposite side to the space S to be sealed of the gasket installation groove 31 and the adhesive agent sump 15, thereby effectively preventing the excess adhesive agent from interposing to the back surface seal portion 12 side. Accordingly, the same effect as the first embodiment can be achieved.

Figure 4:
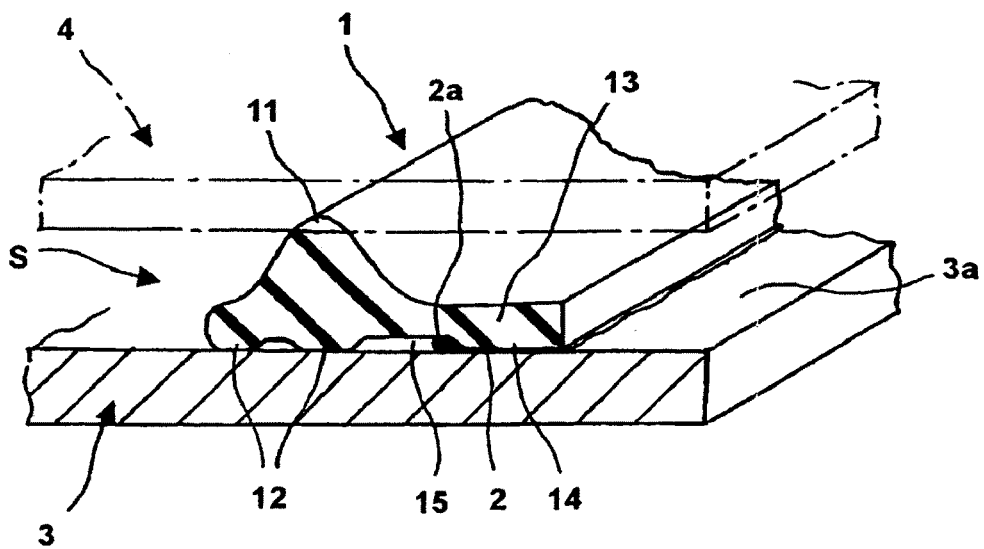
FIG. 4 is a partly cross sectional perspective view showing an installation state of a third embodiment in which the gasket in accordance with the present invention is applied as the gasket for the fuel battery.

Next, FIG. 4 is a partly cross sectional perspective view showing an installation state of a third embodiment in which the gasket in accordance with the present invention is applied as the gasket for the fuel battery. The gasket in accordance with this embodiment is provided with the structure corresponding to the first to third aspects, and has a chevron-shaped main lip 11 which is closely contacted with the high polymer electrolyte membrane (not shown) with a desired collapse margin, plural lines of back surface seal portions 12 which are formed to protrude in a back surface side thereof, an extension portion 13 which protrudes to the opposite side to the space S to be sealed from a base portion of the main lip 11, and an adhesion portion 14 which is formed to protrude in parallel to the back surface seal portion 12 in a back surface side of the extension portion 13. Further, a groove-like adhesive agent sump 15 is provided in a concave shape between the back surface seal portion 12 and the adhesion portion 14.

On the other hand, a gasket installation groove as shown in FIG. 2 or 3 is not formed in the separator 3 corresponding to the plate body to be adhered, the adhesion portion 14 of the gasket 1 is adhered to the flat surface 3a of the separator 3 facing to the high polymer electrolyte membrane (not shown) via the adhesive agent 2, and the back surface seal portions 12 positioned at the space S to be sealed side are closely contacted therewith. The excess adhesive agent 2a running over to the back surface seal portion 12 side from the portion between the surface 3a of the separator 3 and the adhesion portion 14 at a time of adhesion is held in the adhesive agent sump 15, thereby effectively preventing the excess adhesive agent from interposing to the back surface seal portion 12 side. Accordingly, the same effect as the first embodiment can be achieved.

Figure 5:
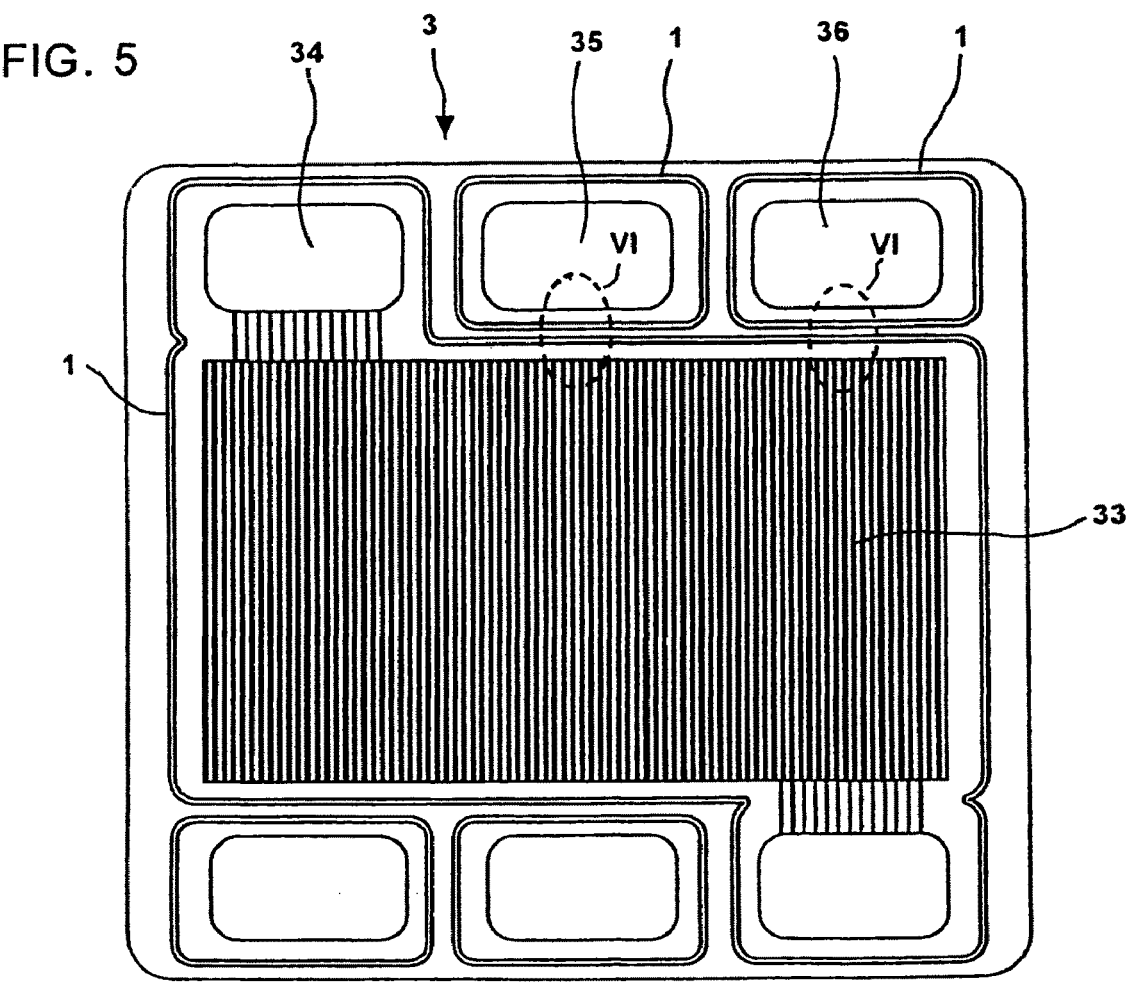
FIG. 5 is a view showing a surface of a separator to which the gasket is attached.

FIG. 5 is a view showing a surface of the separator 3 to which the gasket 1 is attached. Reference numeral 33 in the drawing denotes a lot of flow path grooves formed in the surface of the separator 3 and circulating the fuel gas or the oxidizing gas, reference numeral 34 denotes a manifold provided in the separator 3 and communicating with the flow path groove 33, and reference numerals 35 and 36 denote manifolds provided in the separator 3 and communicating with respective flow path grooves (not shown).

In the separator 3 shown in FIG. 5, there are the gasket 1 provided so as to surround a forming region of the flow path groove 33 and an opening portion of the manifold 34, the gasket 1 provided so as to surround an opening portion of the manifold 35, and the gasket 1 provided so as to surround an opening portion of the manifold 36. Further, in a portion shown by reference symbol VI, the gasket 1 surrounding the forming region of the flow path groove 33 and the opening portion of the manifold 34 and a part of the gasket 1 surrounding the opening portion of the manifold 35, or the gasket 1 surrounding the forming region of the flow path groove 33 and the opening portion of the manifold 34 and a part of the gasket 1 surrounding the opening portion of the manifold 36 extend in parallel in the state of being close to each other.

Figure 6:
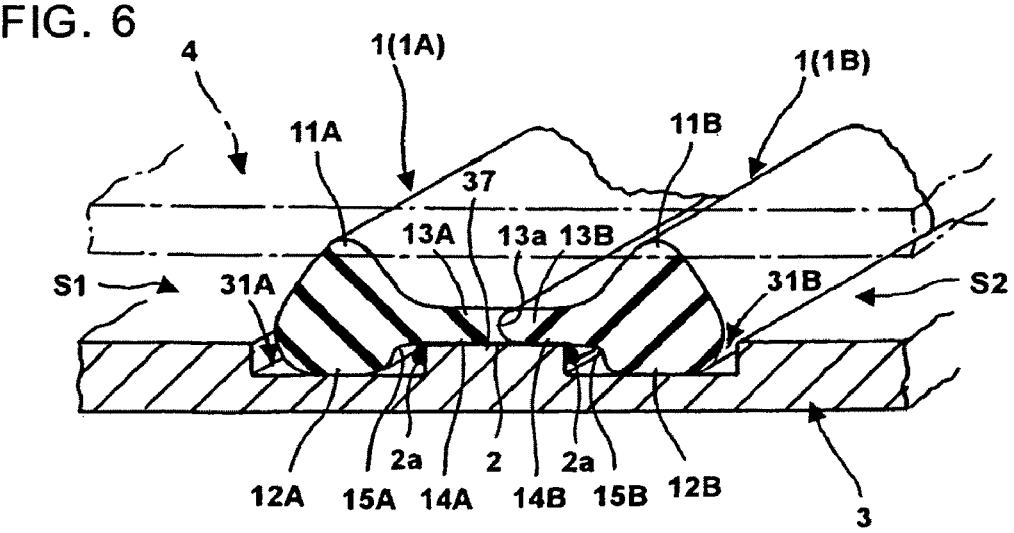
FIG. 6 is a partly cross sectional perspective view showing an installation state of a fourth embodiment in which the gasket in accordance with the present invention is preferably applied to a portion VI in FIG. 5.

FIG. 6 is a partly cross sectional perspective view showing an installation state of a fourth embodiment in which the gasket in accordance with the present invention is applied as the gasket for the fuel battery. The gasket in accordance with this embodiment is basically provided with the structure corresponding to the first to fourth aspects, and is preferably applied to the case of including the part extending in parallel in the state of being close to each other as shown by the portion VI in FIG. 5 mentioned above. Gaskets 1A and 1B shown in FIG. 6 respectively aim at sealing against different fluids. For example, the fuel gas circulates in the space S1 to be sealed by one gasket 1A, and the oxidizing gas circulates in the space S2 to be sealed by the other gasket 1B.

The gaskets 1A and 1B are basically the same as the previously described gasket in FIG. 3 (the second embodiment). The gaskets 1A and 1B respectively have main lips 11A and 11B protruding in a chevron shape and closely contacted with the high polymer electrolyte membrane 4 by a desired collapse margin, back surface seal portions 12A and 12B formed in back surface sides thereof, and extension portions 13A and 13B protruding from portions between the main lips 11A, 11B and the back surface seal portions 12A, 12B, and flat back surfaces of the extension portions 13A and 13B form adhesion portions 14A and 14B. Further, a concave fitting groove 13a is formed in a leading end of the extension portion 13A in one gasket 1A, and a leading end of the extension portion 13B in the other gasket 1B is formed in a convex shape capable of closely fitting to the fitting groove 13a.

On the other hand, a pair of gasket installation grooves 31A and 31B extending in correspondence to the position in which the respective back surface seal portions 12A and 12B of the gaskets 1A and 1B are placed and having a rectangular cross section are formed in the separator 3. The gasket installation grooves 31A and 31B are formed at a width which can receive the back surface seal portions 12A ad 12B, and an interval between both the grooves 31A and 31B (a width of a groove shoulder 37) is slightly smaller than a length of both the extension portions 13A and 13B at a time of fitting the fitting groove 13a of the extension portion 13A in the gasket 1A to the leading end of the extension portion 13B in the gasket 1B.

In the structure mentioned above, when adhering the gaskets 1A and 1B to the separator 3, the gaskets 1A and 1B are adhered by first applying the adhesive agent 2 to the groove shoulder 37 between the gasket installation grooves 31A and 31B in the separator 3, inserting both the back surface seal portions 12A and 12B to the gasket installation grooves 31A and 31B in the state of fitting the fitting groove 13a of the extension portion 13A in the gasket 1A to the leading end of the extension portion 13B in the gasket 1B, and pressing the adhesion portions 14A and 14B in the back surfaces of the extension portions 13A and 13B to the application surface (the groove shoulder 37) of the adhesive agent 2. At this time, the excess adhesive agent 2a runs over to both sides from the portion between the groove shoulder 37 and the adhesion portions 14A and 14B, however, since adhesive agent sumps 15A and 15B are provided respectively between the adhesion portion 14A in the gasket 1A and the back surface seal portion 12A, and between the adhesion portion 14B in the gasket 1B and the back surface seal portion 12B, the running over excess adhesive agents 2a and 2a are held within the adhesive agent sumps 15A and 15B, thereby effectively preventing the excess adhesive agent from interposing to the back surface seal portions 12A and 12B side.

The first to fourth embodiments mentioned above employ the adhesive agent 2 as an adhesion means of the gasket 1 (1A or 1B) to the separator 3, however, the present invention can be applied to a structure adhered in accordance with a vulcanizing adhesion or a structure using a sheet-like adhesive member. The next described embodiments in FIGS. 7 and 8 employ the adhesion means mentioned above.

Figure 7:
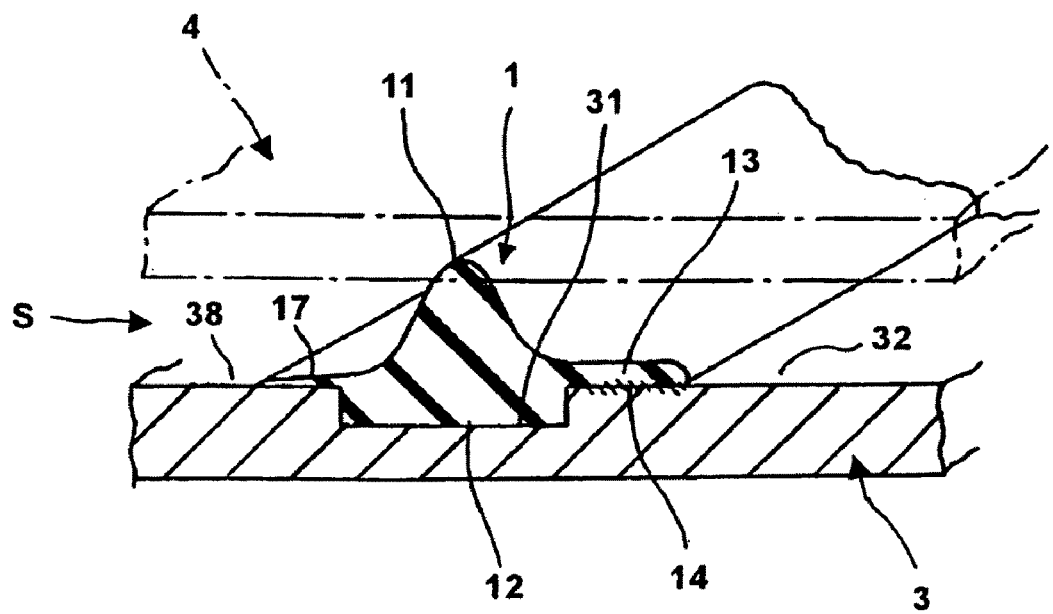
FIG. 7 is a partly cross sectional perspective view showing an installation state of a fifth embodiment in which the gasket in accordance with the present invention is applied as the gasket for the fuel battery.

First of all, FIG. 7 is a partly cross sectional perspective view showing an installation state of a fifth embodiment in which the gasket in accordance with the present invention is applied as the gasket for the fuel battery. The gasket 1 in accordance with this embodiment is integrally formed in the separator 3, and has the main lip 11 protruding in a chevron shape and closely contacted with the high polymer electrolyte membrane 4 by a desired collapse margin, the back surface seal portion 12 formed in a back surface side thereof, the extension portion 13 protruding to the opposite side to the space S to be sealed from a portion between the main lip 11 and the back surface seal portion 12, and a flat back surface of the extension portion 13 forms the adhesion portion 14. The back surface seal portion 12 is closely fitted to a gasket installation groove 31 formed in the separator 3 in correspondence to the installation position of the gasket 1 and having a rectangular cross section, and the adhesion portion 14 is vulcanized and adhered to a groove shoulder 32 in an opposite side to the space S to be sealed of the gasket installation groove 31.

The gasket 1 is made integral to the separator 3 at the same time of forming the gasket 1 by previously applying an adhesive agent for vulcanizing adhesion to the groove shoulder 32 of the separator 3, thereafter setting the separator 3 within a predetermined metal mold (not shown), injecting an unvulcanized rubber material into a cavity defined with respect to an inner surface of the metal mold along the gasket installation groove 31 and vulcanizing it. The adhesion portion 14 is integrally vulcanized and adhered to the groove shoulder 32 by the adhesive agent for vulcanizing adhesion applied to the groove shoulder 32 of the separator 3, however, the back surface seal portion 12 is formed in a rectangular cross sectional shape while copying with the inner surface of the gasket installation groove 31 of the separator 3, that is, is closely contacted with the inner surface of the gasket installation groove 31 in a non-adhesion state.

In this case, a membrane-like portion 17 is formed in the opposite side to the extension portion 13 (the adhesion portion 14), that is, in the space S to be sealed side of the main lip 11 and the back surface seal portion 12, and is closely contacted with the groove shoulder 38 in the space S to be sealed side of the gasket installation groove 31 in the separator 3.

In this embodiment, since the back surface seal portion 12 exists between the adhesion portion 14 and the space S to be sealed, and the membrane-like portion 17 has a sealing function, it is possible to prevent an influence caused by the eluted component from the vulcanizing adhesion portion eluting into the gas circulating in the space S to be sealed. Further, similarly to each of the embodiments mentioned above, since a suitable close contact surface pressure is applied to the back surface seal portion 12 on the basis of a reaction force of the collapse margin of the main lip 11 with respect to the high polymer electrolyte membrane 4, an excellent sealing performance can be achieved, and since the back surface seal portion 12 is firmly fixed to the inner surface of the gasket installation groove 31 on the basis of the reaction force with the fastening margin mentioned above, a fixing performance of the gasket 1 is high, so that it is possible to reduce a use amount of the agent for vulcanizing adhesion at a time of forming, and it is possible to effectively inhibit the component eluting amount.

Figure 8:
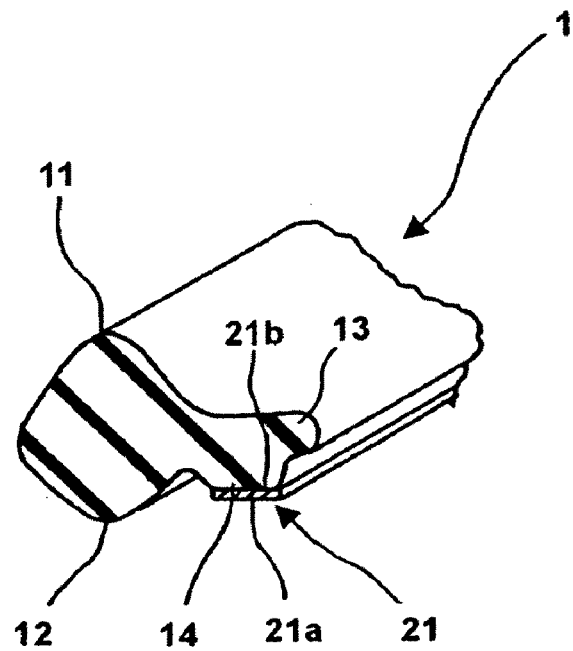
FIG. 8 is a partly cross sectional perspective view showing a single body of a sixth embodiment in which the gasket in accordance with the present invention is applied as the gasket for the fuel battery.

Next, FIG. 8 is a partly cross sectional perspective view showing a single body of a sixth embodiment in which the gasket in accordance with the present invention is applied as the gasket for the fuel battery. The gasket 1 in accordance with this aspect is structured such that a sheet-like adhesion member 21 is stuck to the adhesion portion 14 of the gasket 1 in the previously described FIG. 1 (the first embodiment).

In detail, the sheet-like adhesive member 21 is structured such that an adhesive agent or a pressure sensitive adhesive agent (not shown) is applied to one surface (a lower surface in the drawing) 21a of a synthetic resin film, and the other surface (an upper surface in the drawing) 21b is adhered to the adhesion portion 14 of the gasket 1 in accordance with an insert molding method. The synthetic resin film is selected from a synthetic resin film made of an electrical insulating synthetic resin material such as a polyethylene terephthalate (PET), a polyethylene naphthalate (PEN), a polyimide (PI) or the like. Further, the rubber material of the gasket 1 is not particularly limited, however, the silicone rubber (VMQ), the fluorine-contained rubber (FKM), the ethylene propylene rubber (EPDM) mentioned above and the like are preferable.

The synthetic resin film, in which the adhesive agent for the vulcanizing adhesion is previously applied to the other surface 21b, is set within the metal mold for injection molding the gasket 1, the unvulcanized rubber material is injected into the metal mold, and the synthetic resin film is made integral to the gasket 1 at the same time of forming the gasket 1. The structure is made such that a releasing film (not shown) is stuck to one surface 21a of the synthetic resin film to which the adhesive agent or the pressure sensitive adhesive agent is applied, the releasing film mentioned above is peeled off at a time of attaching the gasket 1 to a predetermined position of the separator 3 so as to expose one surface 21a, to which the adhesive agent or the pressure sensitive adhesive agent is applied, and adhere.

In this embodiment, since the back surface seal portion 12 exists between the sheet-like adhesion member 21 provided in the adhesion portion 14 and the space S to be sealed, it is possible to prevent an influence caused by the eluted component from the adhesive agent or the pressure sensitive adhesive agent of the sheet-like adhesion member 21 eluting to the gas circulating in the space to be sealed, and it is possible to achieve the same effect as the first embodiment. Accordingly, in this embodiment, since the fixed side seal with the separator is carried out by the back surface seal portion 12, and does not depend on the sheet-like adhesion member 21, it is not necessary that the sheet-like adhesion member 21 is stuck to an entire periphery of the adhesion portion 14.

In all the embodiments mentioned above, the gasket 1 is adhered to the separator 3 side, however, the structure may be made such that the gasket 1 is adhered to the high polymer electrolyte membrane 4 and the main lip 11 is closely contacted with the separator 3. In this case, the high polymer electrolyte membrane 4 corresponds to the plate body to be adhered described in the first aspect.

Further, the gasket in accordance with the embodiments mentioned above can be applied, for example, to a gasket of a gasket integrally formed type top cover for sealing a case receiving a hard disc corresponding to a recording medium, a head reading and writing data with respect to the head disc, an actuator driving the head and the like, in a hard disc drive apparatus (HDD) of a personal computer, in addition to the fuel battery.

Figure 9:
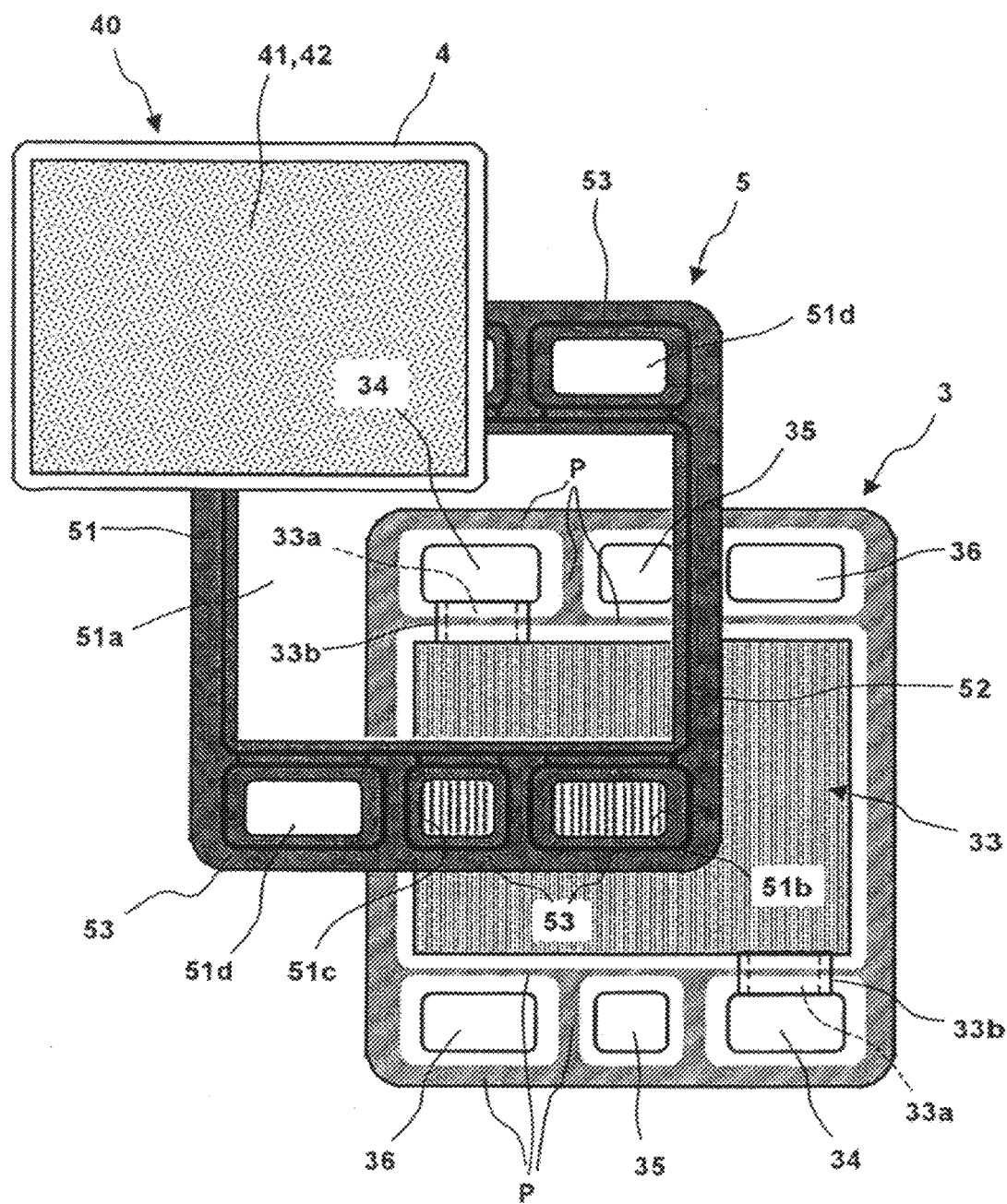
FIG. 9 is a view, as seen from a laminating direction, of a separated state of a fuel battery cell to which the invention in accordance with the sixth aspect is applied, as a seventh aspect in accordance with the present invention.
Figure 10:
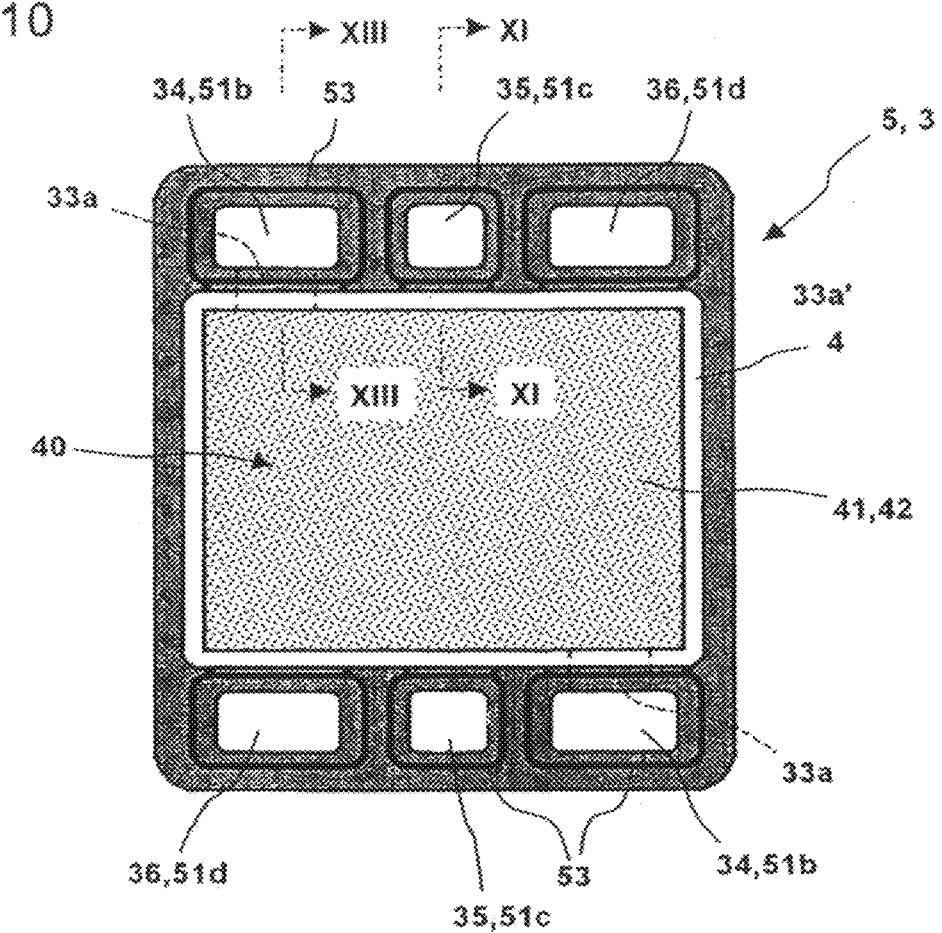
FIG. 10 is a view, as seen from the laminating direction, of an assembled state of the fuel battery cell in FIG. 9.
Figure 11:
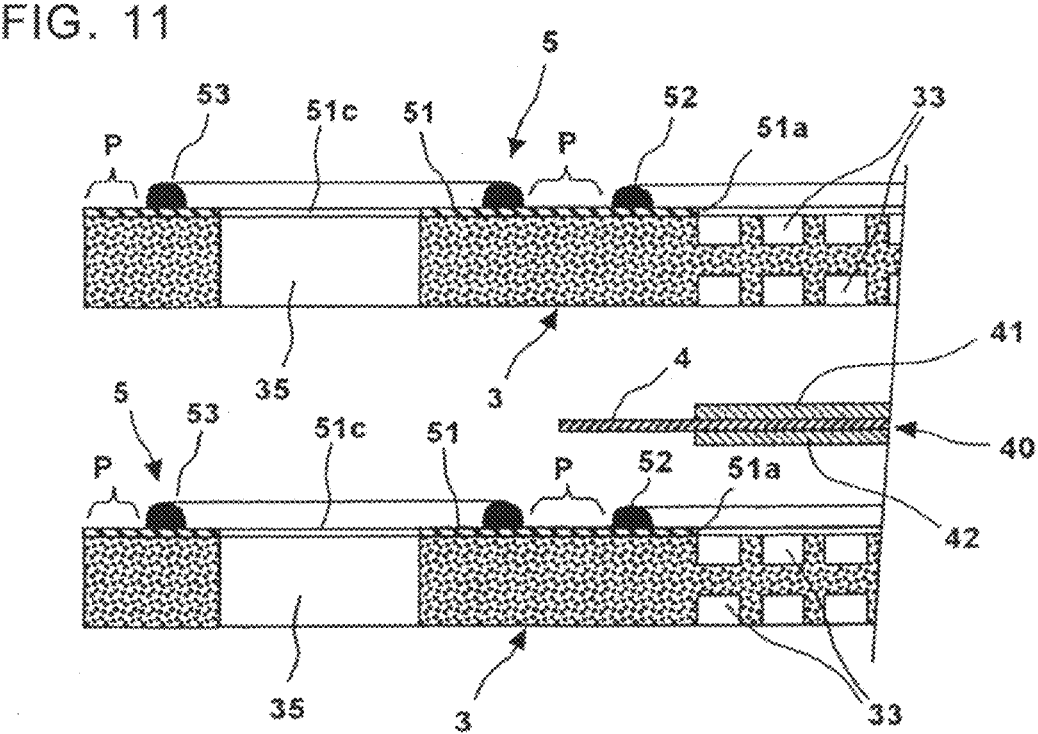
FIG. 11 is a cross sectional view of a separated state of the fuel battery cell, shown by cutting at a position along a line XI-XI in FIG. 10.

Next, FIG. 9 is a view, as seen from a laminating direction, of a separated state of a fuel battery cell as a seventh embodiment to which the gasket in accordance with the present invention is applied as the gasket for the fuel battery, FIG. 10 is a view, as seen from the laminating direction, of an assembled state of the fuel battery cell in FIG. 9, and FIG. 11 is a cross sectional view of a separated state of the fuel battery cell, shown by cutting at a position along a line XI-XI in FIG. 10.

This embodiment corresponds to the invention in accordance with the fifth aspect. In these FIGS. 9, 10 and 11, reference numeral 3 denotes a separator, reference numeral 4 denotes a high polymer electrolyte membrane, reference numerals 41 and 42 denote a pair of catalyst electrode layers provided in both surfaces of the high polymer electrolyte membrane 4, and reference numeral 5 denotes a gasket in accordance with the present embodiment in which gasket lips 52 and 53 are integrally provided in an insulating layer 51 positioned in an outer peripheral side of the catalyst electrode layers 41 and 42 and interposed between outer peripheral portions of the respective separators 3. The high polymer electrolyte membrane 4 and the catalyst electrode layers 41 and 42 provided in both surfaces thereof construct a membrane electrode assembly (MEA) 40.

The separator 3 is made of a carbon or the like having a conductivity and a gas impermeability, a lot of groove-shaped flow path grooves 33 are formed in both surfaces thereof so as to be positioned to face surfaces of the catalyst electrode layers 41 and 42, and a plurality of manifolds 34 to 36 for supplying or discharging a fuel gas, an oxidizing gas or a cooling water are provided in an outer peripheral portion thereof, in the same manner as FIG. 5 described previously. Further, as shown in FIG. 9, in a plurality of manifolds 34 to 36, the manifolds for supplying the fuel and discharging the fuel communicate via flow paths 33*a* and 33*a* covered by cover plates 33*b* and 33*b* supporting the gasket 5 in both ends of the flow path groove 33 formed in one surface of the separator 3, and the manifolds for supplying the oxidizing gas and discharging the oxidizing gas communicate in the same manner via a passage (not shown) covered by a cover plate supporting the gasket 5 in both ends of the flow path groove 33 formed in the other surface of the separator 3.

The gasket 5 is structured such that gasket lips 52 and 53 made of a rubber-like elastic material such as VMQ, FKM, EPDM or the like are integrally provided in the insulating layer 51 made of a synthetic resin material, for example, PET, PEN, PI or the like, or a rubber-like elastic material which is excellent in an electric insulating property between the respective separators 3. As a method of integrally forming the gasket lips 52 and 53 with respect to the insulating layer 51, there can be employed both of a method of directly forming the gasket lip 52 in the insulating layer 51 in accordance with an injection molding or the like, and a method of attaching the independently formed gasket lips 52 and 53 by an adhesive agent. In this case, in the latter method, since there is a possibility that the elution component is eluted from the adhesive agent, and there is a risk that the adhesive agent peeling or the like is generated, the former integrally forming method is preferable.

The insulating layer 51 is in a sheet shape with an outer peripheral edge which is formed in the same shape and the same size as those of an outer peripheral edge of the separator 3, has a window portion 51*a* corresponding to a power generating region (a forming region of the catalyst electrode layers 41 and 42 in the MEA 40 and the flow path groove 33 in the separator 3) in an inner periphery, and is provided with a plurality of manifolds 51*b* to 51*d* which have the same shape and the same size as those of the respective manifolds 34 to 36, at positions corresponding to the respective manifolds 34 to 36 in the separator 3. Further, the gasket lip 52 is formed so as to surround an outer periphery of the window portion 51*a*, and the gasket lip 53 is formed so as to surround an outer periphery of each of the manifolds 51*b* to 51*d*.

If a thickness of the insulating layer 51 is too thin, a strength and a sufficient insulating property can not be obtained, and if it is too thick inversely, a volume of a stack formed by laminating the fuel battery cells is vainly increased. Accordingly, the thickness of the insulating layer 51 is set to 50 to 500 μm, and preferably set to 100 to 300 μm.

A region P shown by hatching with diagonal lines in FIG. 9 corresponds to an adhesive agent applying region in the separator 3. The adhesive agent applying region P, as shown in FIG. 11, corresponds to a region in the opposite side to the flow path groove 33 and each of the manifolds 34 to 36, which are the objects to be sealed by the gasket lips 52 and 53, with respect to the gasket lips 52 and 53 at a time of positioning and laminating the gasket 5 to the separator 3. The gasket 5 is adhered by applying the adhesive agent to the adhesive agent applying region P in the separator 3 and thereafter positioning and pressing the surface in the side in which the gasket lips 52 and 53 are not formed in the insulating layer 51.

In each of the fuel battery cells provided with the structured mentioned above, the fuel gas (the hydrogen) is supplied to the flow path groove 33 facing to one of the catalyst electrode layers 41 and 42 of the MEA 40, via the passages 33*a* and 33*a* between the manifolds for supplying the fuel and discharging the fuel, and the oxidizing gas (the oxygen) is supplied to the flow path groove 33 facing to the other catalyst electrode layer. Further, a reaction for decomposing a hydrogen molecule into a hydrogen ion and an electron is executed in a side (an anode) to which the fuel gas is supplied, and a reaction for generating water from an oxygen, the hydrogen ion and the electron is executed in a side (a cathode) to which the oxidizing gas is supplied, whereby an electromotive force is generated.

The outer peripheral portions (the outer peripheral sides of the power generating region) of the separator 3 which are adjacent in the thickness direction are insulated from each other on the basis of the interposition of the sheet-shaped insulating layer 51 in the gasket 5. In an assembled state, the gasket lip 52 in the gasket 5 is closely contacted with the outer peripheral portion of the high polymer electrolyte membrane 4 (the MEA 40) by a suitable collapse margin, the gasket lip 53 is closely contacted with the outer peripheral portion of the separator 3 by a suitable collapse margin, thereby achieving an excellent sealing performance with respect to the fuel gas and the oxidizing gas circulating within the flow path groove 33, and the fuel gas, the oxidizing gas or the cooling water circulating in the manifolds 34 to 36. Further, the gasket lip 52 has a function of elastically pressing the outer peripheral portion of the high polymer electrolyte membrane 4 (the MEA 40) so as to clamp.

Further, since the gasket lips 52 and 53 of the gasket 5 are closely contacted with the separator 3 or the high polymer electrolyte membrane 4 by the desired collapse margin, a close contact surface pressure applied to the separator 3 or the high polymer electrolyte membrane 4 is increased on the basis of the compression reaction force of the gasket lips 52 and 53, in the portion corresponding to the back surface side of the gasket lips 52 and 53 in the insulating layer 51, whereby the portion functions as a back surface seal portion, and on the contrary, the surface pressure becomes small in the portion corresponding to the adhesive agent applying region P. Accordingly, the adhesive agent applied to the adhesive agent applying region P is hard to run over to the side of the flow path groove 33 and each of the manifolds 34 to 36 corresponding to the spaces to be sealed, and it is possible to effectively prevent the elution component from the adhesive agent from being discharged to the side of the flow path groove 33 and each of the manifolds 34 to 36 corresponding to the spaces to be sealed.

Figure 12:
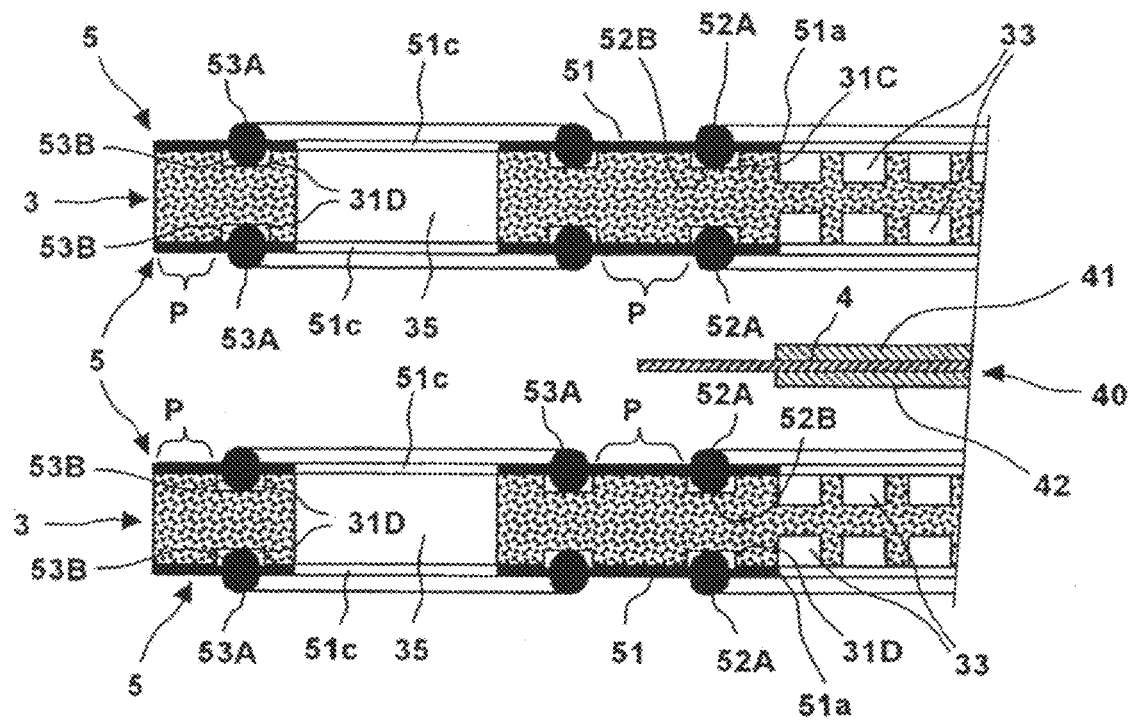
FIG. 12 is a cross sectional view of a separated state of a fuel battery cell, shown by cutting at a position along the line XI-XI in FIG. 10, in accordance with an eighth embodiment in which the gasket in accordance with the present invention is applied as the gasket for the fuel battery.
Figure 13:
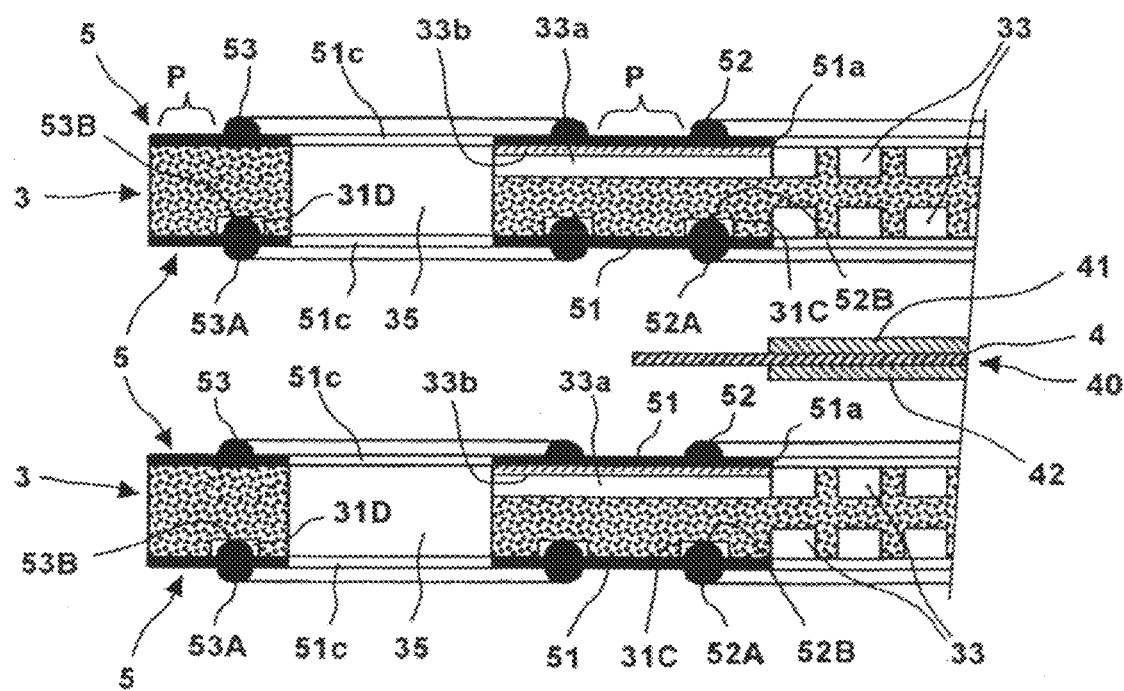
FIG. 13 is a cross sectional view of the separated state of the fuel battery cell, showing the gasket in FIG. 12 by cutting at a position along a line XIII-XIII in FIG. 10.
Figure 14:
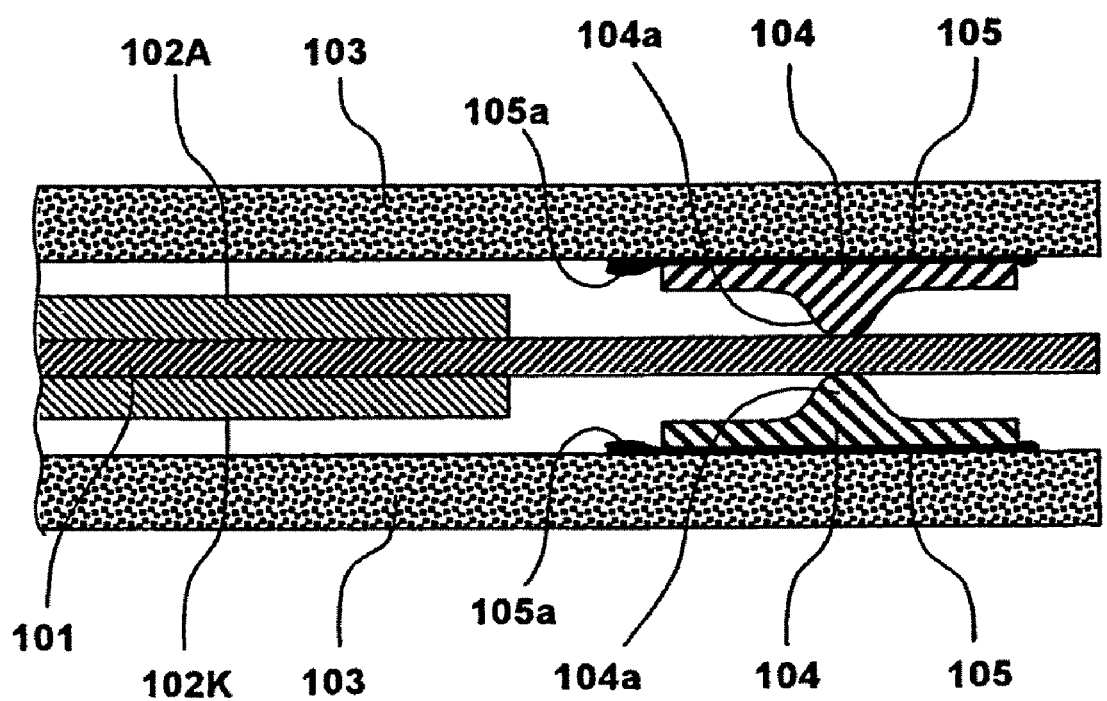
FIG. 14 is a cross sectional view showing a part of a fuel battery to which a gasket in accordance with a conventional art is installed.

Next, FIG. 12 is a cross sectional view of a separated state of a fuel battery cell, shown by cutting at a position along the line XI-XI in FIG. 10, in accordance with an eighth embodiment in which the gasket in accordance with the present invention is applied as the gasket for the fuel battery, and FIG. 13 is a cross sectional view of the separated state of the fuel battery cell, shown by cutting at a position along a line XIII-XIII in FIG. 10.

This embodiment corresponds to the invention in accordance with the sixth aspect, and the gasket 5 is adhered to both surfaces of each of the separators 3.

The gasket 5 is entirely made of a single rubber-like elastic material selected from VMQ, FKM, EPDM and the like, and gasket lips 52A and 53A (hereinafter, refer to as a main lip) and gasket lips 52B and 53B (hereinafter, refer to as a back surface lip) are integrally formed with each other in both surfaces of the insulating layer 51. Accordingly, the insulating layer 51, the main lips 52A and 53A and the back surface lips 52B and 53B are made of rubber-like elastic materials which are continuous with each other, and are structured such that no adhered portion is interposed between both the elements.

In detail, the insulating layer 51 has the outer peripheral edge which is formed in the same shape and the same size as those of the outer peripheral edge of the separator 3, has the window portion 51a corresponding to the power generating region (the forming region of the catalyst electrode layers 41 and 42 in the MEA 40 and the flow path groove 33 in the separator 3) in the inner periphery, and is formed in a sheet shape provided with a plurality of manifolds 51b to 51d corresponding to the respective manifolds 34 to 36 in the separator 3 shown in the previous FIG. 9 (only the manifolds 35 and 51c are shown in FIGS. 12 and 13). The main lip 52A and the back surface lip 52B are formed along an outer periphery of the window portion 51a, and the main lip 53A and the back surface lip 53B are formed along an outer periphery of each of the manifolds 51c (51b, 51d). Further, the back surface lips 52B and 53B are not provided in the portion corresponding to the cover plate 33b (the passage 33a) of the separator 3 shown in the previous FIG. 9, and only the main lips 52A and 53A are formed in this portion as shown in FIG. 13.

On the other hand, gasket installation grooves 31C and 31D are respectively formed in both surfaces in an outer peripheral side of the power generating region in the separator 3 in correspondence to the back surface lips 52B and 53B of the gasket 5. The back surface lips 52B and 53B are closely contacted within the gasket installation grooves 31C and 31D by a predetermined collapse margin. In this case, the gasket installation grooves 31C and 31D are not formed in a portion in which the passage 33a of the separator 3 shown in FIG. 9 passes.

The structures of the other portions, for example, the flow path groove 33 in the separator 3, the arrangement of the manifolds 34 to 36 and the like, the MEA 40 (the high polymer electrolyte membrane 4 and the catalyst electrode layers 41 and 42) and the like are basically the same as the previously explained seventh embodiment.

The insulating layer 51 of the gasket 5 having the structure mentioned above is adhered to the separator 3 via the adhesive agent, and the adhesive agent applying region P of the separator 3 for the adhesion is formed in a region corresponding to an opposite side to the flow path groove 33 and the manifold 35 (34, 36), which are the objects to be sealed by the back surface lips 52B and 53B, with respect to the back surface lips 52B and 53B at a time of positioning and laminating the gasket 5 to the separator 3, in other words, an opposite side to the flow path groove 33 and the manifold 35 (34, 36) with respect to the gasket installation grooves 31C and 31D. The gasket 5 is adhered by applying the adhesive agent to the adhesive agent applying region P of the separator 3 and thereafter pressing the surface in which the back surface lips 52B and 53B exist in the insulating layer 51. Further, since the back surface lips 52B and 53B are fitted to the gasket installation grooves 31C and 31D in the above process, it is possible to easily position them.

At this time, a part of the adhesive agent applied to the separator 3 runs over to both sides from the adhesive agent applying region P by pressing the insulating layer 51 of the gasket 5, however, since the adhesive agent sump shown in the previously explained FIG. 3 is formed between the adhesive agent applying region P and the back surface lips 52B and 53B of the gasket 5 by the gasket installation grooves 31C and 31D, it is possible to effectively prevent the excess adhesive agent from being interposed to the seal surface by the back surface lips 52B and 53B.

In the assembled state of the fuel battery cell, the main lip 52A of the gasket 5 adhered to one separator 3 in the separators 3 and 3 adjacent to each other, and the main lip 52A of the gasket 5 adhered to the other separator 3 are closely contacted with the outer peripheral portion of the MEA 40 (the high polymer electrolyte membrane 4) by the suitable collapse margin, thereby well sealing the power generating region and elastically clamping the MEA 40. Further, the main lip 53A of the gasket 5 adhered to one separator 3, and the main lip 53A of the gasket 5 adhered to the other separator 3 are closely contacted with each other by the suitable collapse margin, thereby achieving a good sealing performance with respect to the manifold 35 (34, 36). Further, since the back surface lips 52B and 53B are closely contacted with the bottom portion of the gasket installation grooves 31C and 31D by the suitable surface pressure on the basis of the compression reaction force of the main lips 52A and 53A, it is possible to effectively prevent the adhesive agent in the adhesive agent applying region P and the elution component from the run over excess adhesive agent from being discharged to the flow path groove 33 and the manifold 35 (34, 36).

In this case, since the main lips 52A and 53A are backed up by the cover plate 33b in the forming portion of the passage 33a of the separator 3 shown in FIG. 13, the main lips 52A and 53A can be well closely contacted with the facing separator 3.

Since the gasket 5 has the structure in which the insulating layer 51 and the gasket lips (the main lips 52A and 53A and the back surface lips 52B and 53B) are continuously formed with each other, it is possible to provide at a low cost in accordance with a simultaneous integral molding with the rubber-like elastic material. Further, it is not necessary to adhere between both the elements. Further, since it is not necessary to adhere the insulating layer 51 and the gasket lip by the adhesive agent, the elution component is not generated therefrom, and there is no risk that the adhesive agent peeling or the like is generated.

In accordance with this embodiment, the gasket 5 is provided in both the surfaces of each of the separators 3, however, the structure may be made such that the gasket 5 is provided only in one surface and the main lip 53A is closely contacted with the adjacent separator 3, in the same manner as shown in FIG. 11.

What is claimed is:

1. A fuel battery comprising
a gasket,
a separator, and
a high polymer electrolyte membrane,
said gasket including a main lip closely contacted with said high polymer electrolyte membrane on a front side of said gasket,
a back surface seal portion of said gasket closely contacted with the separator on a back side of the gasket,
an adhesion portion of said gasket adhered to said separator by an adhesive agent on the back side of said gasket at a position on an opposite side to a space to be sealed with respect to the back surface seal portion, and
an adhesive agent sump of the gasket provided between said back surface seal portion and said adhesion portion on the back side of said gasket for holding an excess amount of the adhesive agent between the gasket and the separator.

2. The fuel battery as claimed in claim 1, wherein the back surface seal portion is closely contacted with a bottom portion of a gasket installation groove formed in the separator.

* * * * *